March 2, 1926.                                              1,575,081
A. SUK
RECORDING STRIP
Filed Oct. 15, 1921
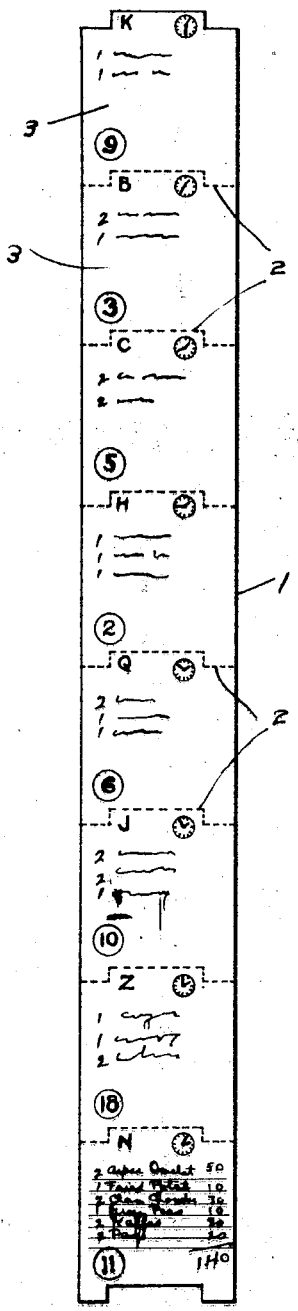
Fig. 1.
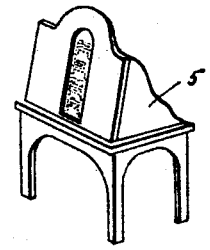
Fig. 2.
Fig. 3.
Inventor.
ANTON SUK.
Attorneys.

Patented Mar. 2, 1926.

1,575,081

UNITED STATES PATENT OFFICE.

ANTON SUK, OF SANTA CRUZ, CALIFORNIA.

RECORDING STRIP.

Application filed October 15, 1921. Serial No. 507,944.

*To all whom it may concern:*

Be it known that I, ANTON SUK, a citizen of the United States, and a resident of Santa Cruz, county of Santa Cruz, and State of California, have invented a new and useful Improvement in Recording Strips, of which the following is a specification.

The present invention relates to a means for recording and controlling food orders dispensed in a restaurant or similar establishment. It has come to my attention that frequently mistakes are made by the waiters as well as by the cook in the serving of food orders on account of the fact that ordinarily the waiter receives the order from the guest and orally transmits the same to the cook. It happens quite frequently that either the waiter fails to give all of the items ordered by the guest or that the cook, trying to listen to several waiters at the same time, does not properly understand all the items communicated to him by the different waiters. It also happens quite frequently that under the system commonly used at the present time of oral transmission of food orders the waiter frequently neglects to place all the items ordered on the final check and thus omits to properly charge the guest for what he received to the detriment of the owner of the establishment.

It is the object of the present invention to provide a means by which these mistakes will be automatically eliminated and by which all the items delivered are simultaneously recorded in proper succession so that it is easy to check the items at any time and to immediately discover any possible discrepancies. Other advantages of my improved means will appear as the description of the same proceeds.

To facilitate the explanation of my invention I accompany my description with a drawing, in which Figure 1 illustrates the record of the food orders made where my invention is applied; Figure 2 a single food order such as made out by the waiter upon receiving the same from the guests, and Figure 3 a perspective view showing a recording machine such as might be used in connection with my invention.

The principal feature of my invention is the providing of mechanical means for receiving the food order from the waiter and for exhibiting the same to the cook or food dispenser. This machine at the same time is adapted to record all the food orders transmitted through it in a permanent manner and in the succession of the orders received, to identify the orders and to indicate the time at which the order was received. In detail my invention would work out as follows:

Assuming that it is to be applied to a restaurant or other food dispensing establishment having a number of waiters or food distributors to receive the orders from the guests, and a food dispensing person who would be in close proximity to the place where the food is prepared and who would fill the orders as they come in from the waiters or food distributors.

The proprietor or manager of the establishment would hand to each waiter a block of blank checks (6) such as shown in Figure 2. Assuming that the block consists of one hundred different checks, the same would be numbered from 1 to 100 in uninterrupted succession. The waiter receiving an order would write the same on the first blank in the manner illustrated in Figure 2 and would also identify the check by placing his name or another identifying sign such as the letter "N" or a number on the check.

He would also simultaneously mark the different charges on his check so that the same would look like it is illustrated in the drawing. With this check he goes to the recording machine illustrated in Figure 3. This machine may be of any type desired, no particular attention being paid in this application to its particular construction. The machine is adapted to receive the order from the waiter and to exhibit the same on the opposite side of the food dispenser. The machine would preferably be made in such a manner that the waiter could record the single items of his food order by merely pressing a button, which, however, is not absolutely necessary for my system since any means enabling the waiter to record the food order and to exhibit the same to the food dispenser will answer the purpose. The machine should be arranged in such a manner that all the incoming food orders are successively recorded on a continuous strip of paper such as shown in Figure 1. It will be seen from said figure that the strip (1), which is of indefinite length, is divided by means of perforated lines (2) into a plurality of parts (3), each of which parts contains a food order. It will be noticed that the first part (3) is provided with the letter "K" and the numeral (9), the letter "K" serving as a means for identifying the waiter and the numeral (9) indicating that the particular check recorded on this part of the strip has been taken from the blank check (9) of the block handed originally to the waiter "K". The second part of the strip is designated by the letter "B" and the numeral (3) indicating that it is taken from the third blank check of waiter "B". In a similar manner the third part is taken from check (5) of waiter "C", the next one from check (2) of waiter "H" and so on. It will be seen that each part of the strip is also provided with a timing device which is adapted to indicate the particular time at which the order was recorded on this strip.

At the bottom of the strip is shown the order taken from the check (11) of waiter "N", that is from the check shown in Figure 2.

One of the advantages of my invention is that it forces the waiter to immediately record the charges made for the single items ordered since he could not transmit his order to the machine (5) shown in Figure 3 without adding the charges to the same. The machine would preferably be provided with some mechanical adding arrangement by means of which all of the items entered would be added together so that the total amount could be ascertained at any time.

The food dispenser would of course be instructed to dispense such food only as had been ordered through the machine (5) and this arrangement would eliminate any discussion or dispute about the orders received from the waiter by the food dispenser.

Briefly stated, the successive steps to be taken are as follows: The waiter is provided with a plurality of blank checks numbered in successive order. When he receives an order from a guest he records the same on one of the checks adding the charges at the same time and identifying the check by placing his name or his letter on the same. He then records the contents of his check in the machine (5) in identically the same manner. The machine is provided with a long continuous recording strip which receives the orders in regular succession and exhibits the same successively to the food dispenser. After they have been exhibited to the dispenser's view for a length of time sufficient to enable the latter to fill the order the record strip is forwarded in the machine and preserved until taken out at the end of the day or whenever desired. During this process the machine has also indicated on each order the time when it was received and has added the different items charged for the order. If at any time the orders come in too quickly for the dispenser the latter may give some signal, preferably by lighting a lamp furnished for that purpose which would indicate to the waiters that no further orders should be transmitted to the machine, until the signal indicates that the machine is free for further use.

I claim:

A record strip comprising a signal oblong length of flexible fibrous material having equally spaced portions thereof scored transversely to provide a series of detachable sections, the scoring between adjacent sections extending along an irregular shaped line so that each section upon detachment will have at one end a projecting tongue.

ANTON SUK.